United States Patent
Tsai et al.

(10) Patent No.: US 9,112,575 B2
(45) Date of Patent: Aug. 18, 2015

(54) SYSTEM AND METHOD FOR SMART RELAY OPERATION IN A WIRELESS COMMUNICATIONS SYSTEM

(75) Inventors: Shiau-He Tsai, San Diego, CA (US); Oghenekome Oteri, San Diego, CA (US); Tao Wu, Carlsbad, CA (US); Yang Tang, San Diego, CA (US); Philippe Sartori, Algonquin, IL (US)

(73) Assignee: Futurewei Technologies, Inc., Plano, TX (US)

( * ) Notice: Subject to any disclaimer, the term of this patent is extended or adjusted under 35 U.S.C. 154(b) by 864 days.

(21) Appl. No.: 12/721,339

(22) Filed: Mar. 10, 2010

(65) Prior Publication Data

US 2010/0232345 A1 Sep. 16, 2010

Related U.S. Application Data

(60) Provisional application No. 61/159,693, filed on Mar. 12, 2009, provisional application No. 61/172,598, filed on Apr. 24, 2009.

(51) Int. Cl.
  *H04B 7/14* (2006.01)
  *H04B 7/155* (2006.01)
(52) U.S. Cl.
  CPC .................................. *H04B 7/15528* (2013.01)
(58) Field of Classification Search
  CPC .................................................... H04B 7/15528
  USPC ................. 370/315, 345; 455/7, 11.1, 21, 23; 375/211
  See application file for complete search history.

(56) References Cited

U.S. PATENT DOCUMENTS

| | | | |
|---|---|---|---|
| 7,975,199 B2* | 7/2011 | Chindapol et al. | 714/751 |
| 2009/0185521 A1* | 7/2009 | Li et al. | 370/315 |
| 2009/0268657 A1* | 10/2009 | Alexiou et al. | 370/315 |
| 2010/0070814 A1* | 3/2010 | Damnjanovic et al. | 714/748 |
| 2011/0110284 A1* | 5/2011 | Wu et al. | 370/312 |
| 2011/0205930 A1* | 8/2011 | Rahman et al. | 370/252 |
| 2012/0106433 A1* | 5/2012 | Seo et al. | 370/315 |

OTHER PUBLICATIONS

Ericsson, "Self backhauling and lower layer relaying," TSG-RAN WG1 #53 bis, R1-082470, Jun. 30-Jul. 4, 2008, 3 pages.
Ericsson, "Wireless relaying for the LTE evolution," TSG-RAN WG1 #54bis, R1-083752, Sep. 29-Oct. 3, 2008, 3 pages.
LG Electronics, "Hybrid of AF and DF in Layer-2 or -3 Relay," 3GPP TSG RAN WG1 Meeting #56, R1-090663, Feb. 9-13, 2009, pp. 1-4.

* cited by examiner

*Primary Examiner* — Donald Mills
*Assistant Examiner* — Henry Baron
(74) *Attorney, Agent, or Firm* — Slater & Matsil, L.L.P.

(57) ABSTRACT

A system and method for smart relay operation in a wireless communications system is provided. A method for smart relay operations includes receiving, at a smart relay, a transmission from a communications device, the transmission destined for a controller, decoding the transmission, computing a response based on the decoding, and transmitting the response to the controller.

18 Claims, 9 Drawing Sheets

M : number of BS receive antennas
K : number of RS transmit antennas
N : number of UE transmit antennas M : number of BS receive antennas
K : number of RS transmit antennas
N : number of UE transmit antennas

SYSTEM AND METHOD FOR SMART RELAY OPERATION IN A WIRELESS COMMUNICATIONS SYSTEM This application claims the benefit of U.S. Provisional Application No. 61/159,693, filed on Mar. 12, 2009, entitled "Method and Apparatus for Composite Channel Generation," and U.S. Provisional Application No. 61/172,598, filed on Apr. 24, 2009, entitled "Method and Apparatus for Smart Relay Operation in a Wireless Communications System," which applications are hereby incorporated herein by reference.

TECHNICAL FIELD

The present invention relates generally to wireless communications, and more particularly to a system and method for smart relay operation in a wireless communications system.

BACKGROUND

A relay node (RN) is considered as a tool to improve, e.g., the coverage area of high data rate communications, group mobility, temporary network deployment, the cell-edge throughput, and/or to provide coverage in new areas. The RN is wirelessly connected to a wireless communications network via a base station (also referred to as a donor base station, a donor enhanced Node B, or a donor cell).

A wireless link between the RN and UEs served by the RN is referred to as an access link and a link between the RN and its base station is named a relay backhaul link. To a UE that is being served by the RN, the RN appears identical to an eNB, scheduling uplink (UL) and downlink (DL) transmissions from and to the UE over an access link. The presence of RNs is not known to legacy UEs, such as Third Generation Partnership Project Release Nine and prior UEs.

SUMMARY

These technical advantages are generally achieved, by embodiments of a system and method for smart relay operation in a wireless communications system.

In accordance with an embodiment, a method for smart relay operations is provided. The method includes receiving, at a smart relay, a transmission from a communications device, the transmission destined for a controller, decoding the transmission, computing a response based on the decoding, and transmitting the response to the controller.

In accordance with another embodiment, a method for smart relay operations is provided. The method includes receiving, at a smart relay, a transmission from a controller, the transmission intended for a communications device, decoding the transmission, computing a first response based on the decoding, transmitting the first response to the controller, receiving a second response transmitted from the communications device to the controller, and decoding the second response.

In accordance with another embodiment, a method for smart relay operations is provided. The method includes determining information related to a channel between a communications device and a controller, determining a precoder based on the information, receiving, at a smart relay, a transmission made by the communications device destined for the controller, amplifying the received transmission, applying the precoder to the received transmission, and transmitting the precoded transmission to the controller.

An advantage of an embodiment is the relay node may apply a precoding to signals that it is relaying rather than just simply amplifying and forwarding the signals, which may help decoding performance at a receiver. The relay node may compute its own precoder values or receive the precoder values from a base station.

A further advantage of an embodiment is that the relay node may participate in hybrid automatic repeat requested transmissions, which may help to improve performance by potentially reducing retransmissions as well as acknowledgement and negative acknowledgement traffic.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

Figure 1:
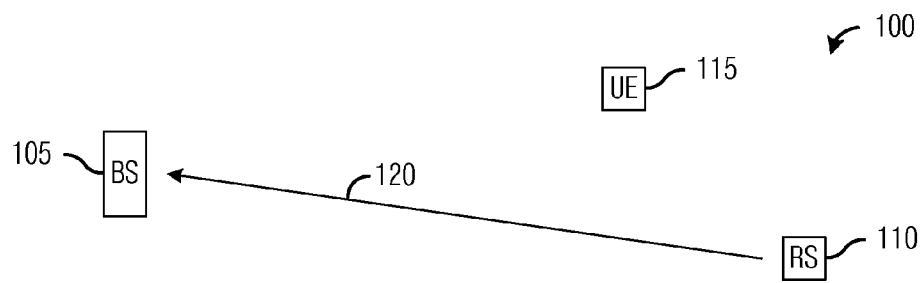
FIG. 1 is a diagram of a wireless communications network.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a Third Generation Partnership Project (3GPP) Long Term Evolution (LTE) compliant communications system with relay nodes. The invention may also be applied, however, to other communications systems with relay nodes, such as 3GPP LTE-Advanced and WiMAX compliant communications systems.

As discussed previously, a repeater (also known as a layer-1 relay station) in a wireless communications system is typically used to transmit signals received at its receive antenna(s) using its transmit antenna(s), potentially after amplifying the signals. A smart repeater (or smart relay or simply a relay node or relay station) may further generate received signals that undergo transmission through virtual channels as desired by a receiver (also referred to as a base station (BS)). The virtual channels are formed with help from the smart repeater. The smart repeater is capable of acquiring necessary control and channel information, and is capable of transforming signals from receive to transmit antennas without demodulating them. The smart repeater acts as an ideal reflector whose channel response to the receiver (BS) complements the channel response from a transmitter (also referred to as source transmitter, user equipment (UE), mobile station (MS), and so forth), directly to the receiver.

The smart repeater may be used to generate received signals that are effectively beamformed in an antenna space spanned by transmit antennas of both the source transmitter and the smart repeater, wherein the antenna space is a subspace spanned by transmit antennas of both the source transmitter and the smart repeater. Furthermore, the smart repeater may operate as a hybrid layer-1 and layer-2 relay station that may be capable of multiplexing a current layer-1 relay signal with a packet that previously failed to reach the base station but was successfully decoded at the smart repeater in an antenna space spanned by transmit antennas of both the source transmitter and the smart repeater.

The antenna space spanned by the transmit antennas of both the source transmitter and the smart repeater may be referred to as an extended antenna space or a composite transmit antenna. The extended dimension of the composite transmit antenna is formed with the help from the smart relay that is capable of acquiring necessary control and channel information from the base station, and is capable of transforming signals from its receive antennas to transmit antennas in layer-1 relaying without demodulating them.

The smart relay acts as an integral part of the composite transmitter precoding whose extra degree of freedom gives beamforming gain over what can be achieved by the original transmitter antenna dimension. Furthermore, when the smart relay is equipped with the capability to decode the source signal, the extended antenna space may simultaneously accommodate Hybrid Automatic Repeat Request (HARQ) retransmission out of the smart repeater's buffer and perform layer-1 relaying of source transmitter signals beyond the multiple input, multiple output (MIMO) rank given by the source transmitter antennas. In such a configuration, the rank of the MIMO signals transmitted to the base station is the sum of the antenna dimensions of the smart relay and the source transmitter. The HARQ retransmission out of the smart relay may be viewed as a layer-2 relay since the smart relay decodes and stores the information packet. The hybrid layer-1/layer-2 relaying of multiplexed the HARQ retransmission and the source transmitter signal fully utilizes the spatial domain resources and releases frequency-time resources that are otherwise used for retransmission to be used in the relaying of new source packets.

A wireless communications system includes communication nodes such as a BS, a RS, and a plurality of UE's. A layer-1 relay process (e.g., a repeater process) does not demodulate the signal being relayed during the relay process, hence it only involves an amplify-and-forward operation. Further assumptions include: the RS is (1) capable of monitoring downlink control signaling from the BS to the UE's, (2) aware of which UE to be amplified and forwarded, (3) able to adapt amplitudes and phases from receive antennas to transmit antennas, and (4) able to calculate channel state information (CSI) and amplitude/phase transformation functions. A layer-1 relay with the above capabilities is referred to as a smart repeater hereafter. The process of applying the adaptive amplify-and-forward with a smart repeater is called advanced layer-1 relay.

Figure 2A:
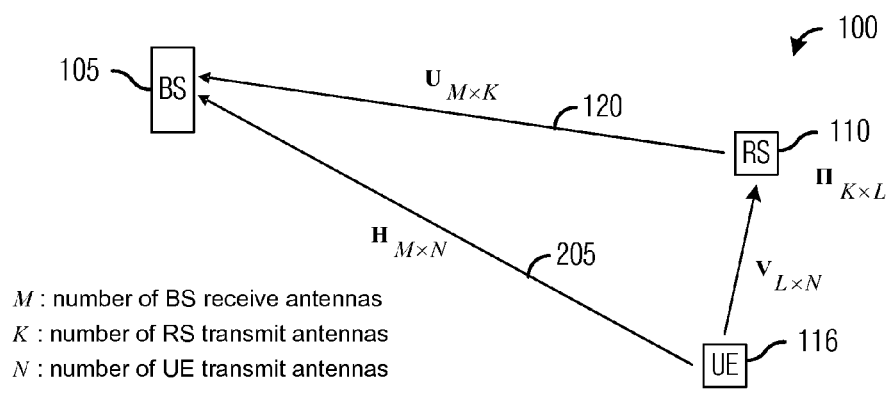
FIG. 2a is a diagram of a wireless communications network with a first labeling of various channel matrices used in advanced layer-1 relay.
Figure 2B:
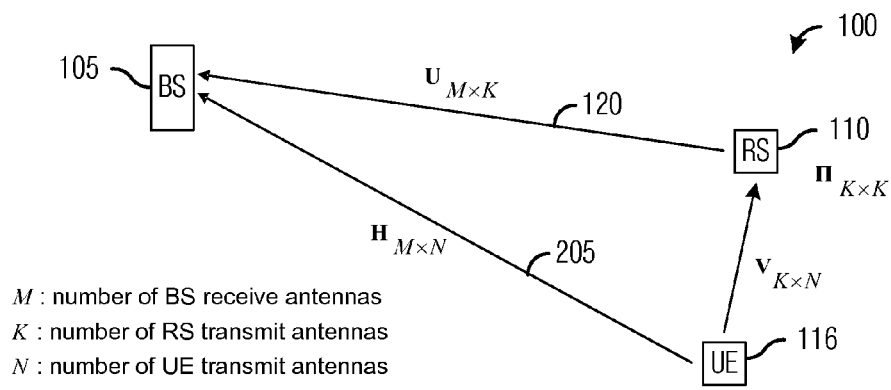
FIG. 2b is a diagram of a wireless communications network with a second labeling of various channel matrices used in advanced layer-1 relay.

FIG. 1 illustrates a wireless communications system 100. Wireless communications system 100 includes a BS 105, a RS 110, and multiple UEs, such as UE 115 and UE 116. A channel 120 between BS 105 and RS 110 is assumed to be relatively stable, i.e., channel 120 may be characterized by sounding with a relatively low rate. FIGS. 2a and 2b illustrate wireless communications system 100 with various channel matrices in advanced layer-1 relay operation, with channel H 205 being a channel between UE 116 and BS 105. A difference between FIG. 2a and FIG. 2b being a different number of antennas at UE 116 and RS 110.

As depicted in FIG. 2a, BS 105 learns $U_{M \times K}$ from signals transmitted by RS 110 without relaying any UE's. For example, RS 110 may transmit a sounding signal to BS 105 and BS 105 may learn $U_{M \times K}$ based on the received sounding signal. In one embodiment, BS 105 informs RS 110 of certain forms of the channel state information (CSI) $U_{M \times K}$, including potentially its inverse matrix if $U_{M \times K}$ is nonsingular. However, if channel 120 has reciprocal properties, the CSI may be inferred by RS 110 itself, e.g., through the use of channel reciprocity.

The dimensions (i.e., the number) of receive and transmit antennas of RS 110 can be different. The embodiments described herein may be applied to RS with unequal receive and transmit antenna dimensions by denoting $V_{L \times N}$ as the channel between a UE, such as UE 116, and RS 110 with L receive antennas, and $\Pi_{K \times L}$ as a receive-to-transmit antenna transformation matrix at RS 110. However, without loss of generality, it is assumed that the number of RS receive antennas is equal to that of RS transmit antennas, i.e., K=L. It is considered straightforward to generalize the discussion herein to unequal receive and transmit antenna dimensions by those of ordinary skill in the art of the embodiments. FIG. 2b illustrates the various channel matrices in wireless communications system 100 for a situation where K=L.

Figure 3:
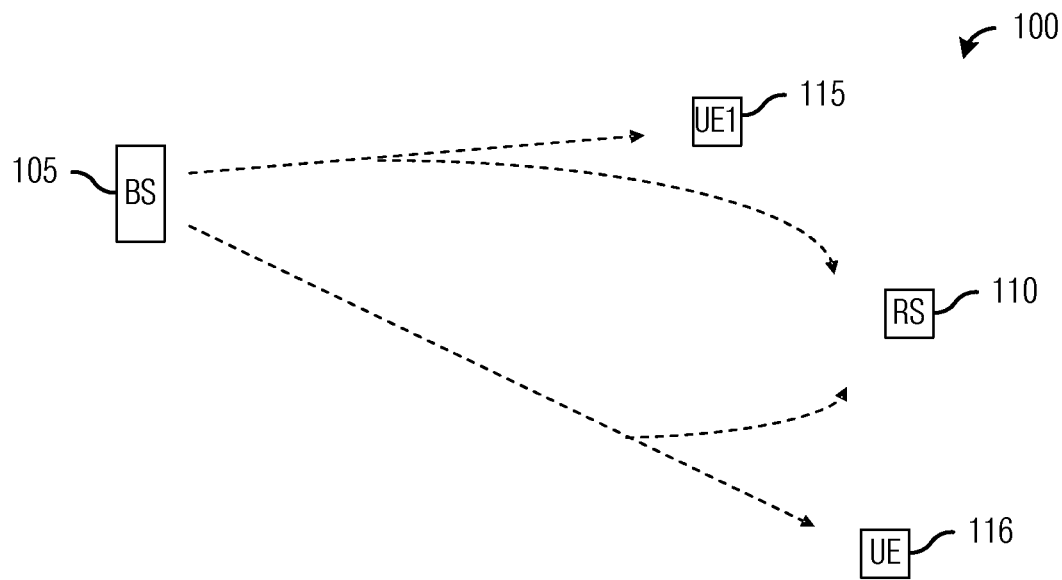
FIG. 3 is a diagram of a RS learning the scheduling of UEs by a BS.

FIG. 3 illustrates a learning of the scheduling of UEs by BS 105 at RS 110. RS 110 may learn the scheduling of UEs by BS 105 by monitoring BS 105 as it transmits control signals to the UEs, such as UE 115 and UE 116. Since RS 110 generally has good reception conditions, RS 110 may be assumed to be capable of decoding control signals intended for the UEs with high success rate.

Figure 4:
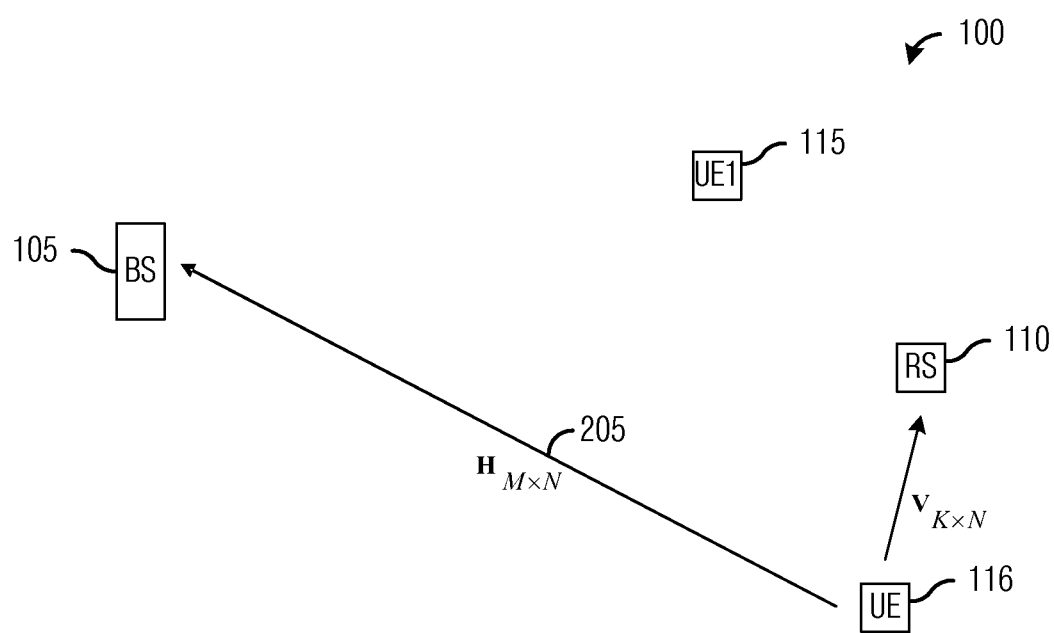
FIG. 4 is a diagram of a RS eavesdropping on transmissions by a UE for the purpose of selecting UEs to relay.

RS 110 may be operating as a friendly eavesdropper of control and scheduling signals. RS 110 may use knowledge obtained from eavesdropping to select the UEs that are candidates for relaying and for applying its ability of transforming amplitudes and phases of received signals in order to optimize the channel response (channel H 205) seen at BS 105, as shown in FIG. 4. The selection is performed by RS 110 learning UE signal quality during its scheduled transmissions, for example.

Figure 5:
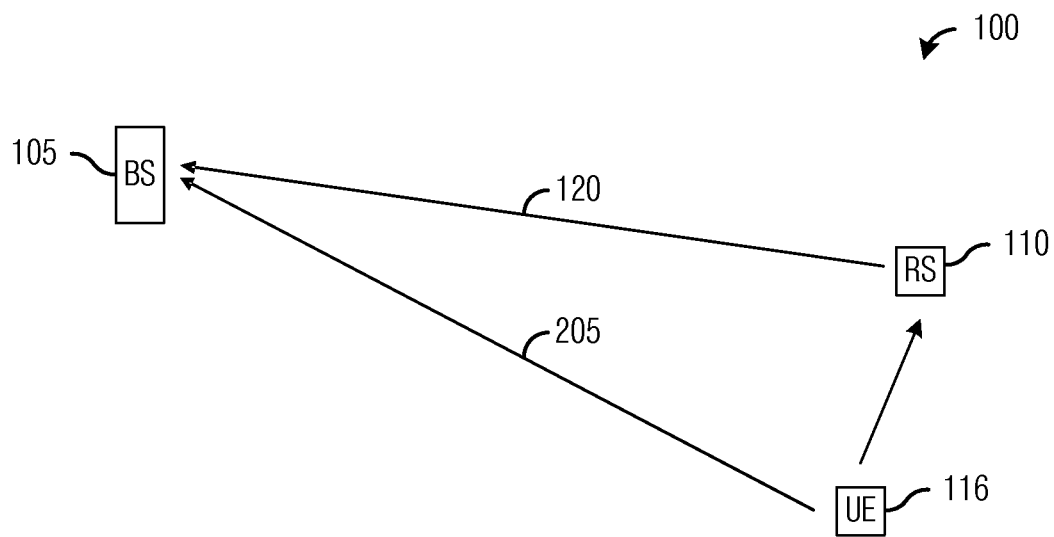
FIG. 5 is a diagram of an amplify-and-forward operation of a RS.

Also as shown in FIG. 4, the channel matrices $H_{M \times N}$ and $V_{K \times N}$ (defined in FIG. 2a) may be estimated. The estimation may be performed by BS 105 and RS 110, respectively. When UE 116 is scheduled for transmission, RS 110 may, at the same time, perform amplify-and-forward operation on received UE signals with predetermined amplitude and phase adjustments, as shown in FIG. 5.

The amplify-and-forward operation in RS 110 is characterized by the amplitude and phase adjustment at RS 110 from its receive antennas to its transmit antennas. The process is described mathematically using the notation shown in FIG. 2. The RS signal component received at BS 105 without any amplitude and phase adjustment is denoted by $$y_{M \times 1}^{(RS)} = U_{M \times K} \cdot V_{K \times N} \cdot P_{N \times D} \cdot d_{D \times 1},$$

where $d_{D \times 1}$ is the data symbol and $P_{N \times D}$ is a precoder matrix. The UE signal component received at BS 105 is denoted by $$y_{M \times 1}^{(UE)} = H_{M \times N} \cdot P_{N \times D} \cdot d_{D \times 1}.$$

Figure 6:
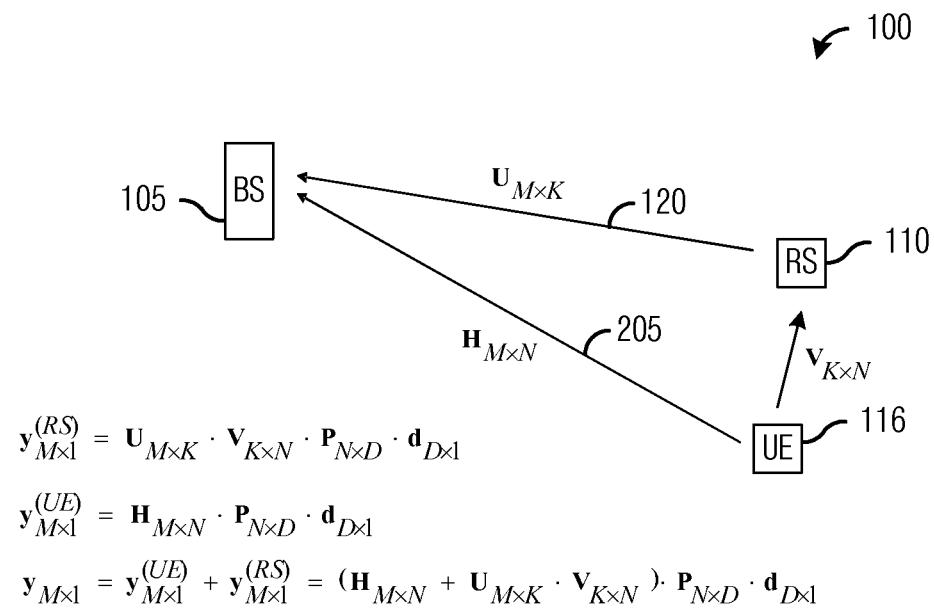
FIG. 6 is a diagram of the amplify-and-forward operation without amplitude and phase adjustment by a RS.

FIG. 6 illustrates the amplify-and-forward operation without amplitude and phase adjustment performed by RS 110. The amplify-and-forward operation is also referred to as a simple layer-1 relay.

Figure 7:
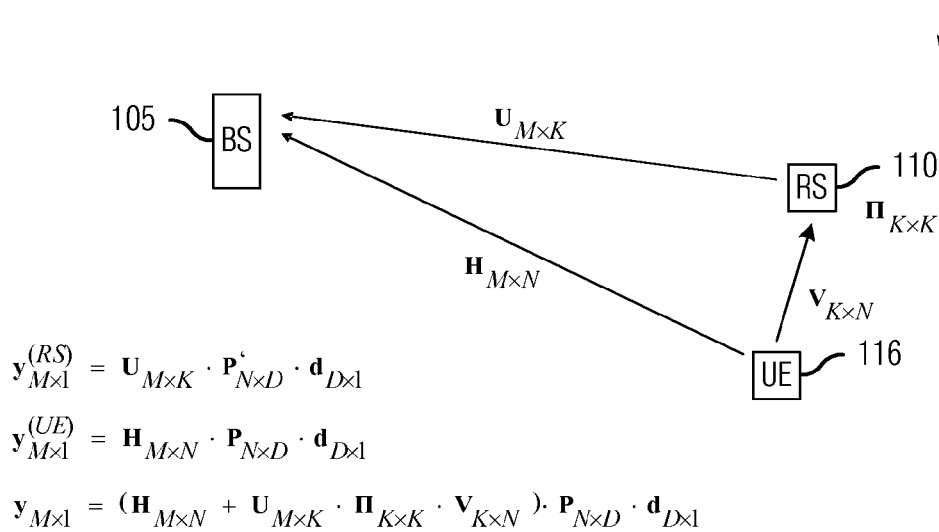
FIG. 7 is a diagram of a wireless communications system with a complementary precoder at a RS for use in advanced layer-1 relay.

FIG. 7 illustrates a wireless communications system 700 with a complementary precoder ($\Pi_{K \times K}$) at RS 110 for use in advanced layer-1 relay operation. A drawback of the simple layer-1 relay operation described previously is that desired composite MIMO channel, $H_{M \times N} \cdot P_{N \times D}$, will become ($H_{M \times N} + U_{M \times K} \cdot V_{K \times N}) \cdot P_{N \times D}$ that varies with different UE's and deviates from expectation of BS 105. Furthermore, the simple layer-1 relay operation does not fully utilize the intelligence residing in the smart relay.

Since the MIMO channel matrix $U_{M \times K}$ is known to BS 105, the channel knowledge between RS 110 and BS 105 does not require UE specific pilots. That is, utilizing the RS-to-BS link for transmitter beamforming may be done with full backward compatibility without introducing new pilots in UE uplink transmission. Therefore an increase in precoder dimension by a transformation, denoted as $\Pi_{K \times K}$, at RS 110 is possible.

From the operations illustrated in FIG. 1 and FIG. 4:
BS 105 knows the MIMO channel, $U_{M \times K}$, from RS 110, and
RS 110 knows the MIMO channel, $V_{K \times N}$, from a UE, such as UE 116, to be relayed.

The goal is to make the RS transmit antenna an integral part of the UE uplink precoding. The precoding from UE 116 through RS 110 to BS 105, as shown in FIG. 7, may be expressed mathematically as:

$$y_{M \times 1}^{(RS)} = U_{M \times K} \cdot P'_{K \times D} \cdot d_{D \times 1},$$

where the assigned UE-RS precoder $P'_{K \times D}$ may be accomplished by introducing an RS transformation $\Pi_{K \times K}$ that satisfies $$P'_{K \times D} = \Pi_{K \times K} \cdot V_{K \times N} \cdot P_{N \times D}.$$

As a result, the MIMO system including BS 105, RS 110, and UE 116 becomes $$\begin{aligned} y_{M \times 1} &= y_{M \times 1}^{(RS)} + y_{M \times 1}^{(UE)} \\ &= (U_{M \times K} \cdot P'_{K \times D} + H_{M \times N} \cdot P_{N \times D}) \cdot d_{D \times 1} \\ &= [U_{M \times K} \quad H_{M \times N}] \cdot \begin{bmatrix} P'_{K \times D} \\ P_{N \times D} \end{bmatrix} \cdot d_{D \times 1} \\ &= [U_{M \times K} \quad H_{M \times N}] \cdot \begin{bmatrix} \Pi_{K \times K} \cdot V_{K \times N} \cdot P_{N \times D} \\ P_{N \times D} \end{bmatrix} \cdot d_{D \times 1}. \end{aligned}$$

With certain constraints, the dimension of the MIMO system effectively increases from M×N (when only the UE-BS link exists) to M×(N+K) (when the UE-RS-BS link is enabled). In this configuration, the RS precoder vector is constrained by the UE precoder vector $P_{N \times D}$ and the linear space of UE-RS MIMO channel matrix $V_{K \times N}$. If RS 110 observes a non-full rank channel $V_{K \times N}$, RS 110 should signal BS 105 to avoid the assignment of a certain ($P'_{K \times D}$, $P_{N \times D}$) pair.

In another embodiment, the increased uplink (UL) antenna dimension may be used for spatial multiplexing with rank larger than the UE antenna dimension. In this case, RS 110 may be acting as an external buffer for past UE packets. The buffering of UE packets may be especially useful in a HARQ process because the retransmission may be sent from RS 110 and multiplexed spatially with new UE packets without consuming additional frequency and time resources.

In addition to the previous assumptions on the RS capability, additional assumptions include: that RS 110 is (1) capable of decoding the UE signal that was being amplified and forwarded, (2) capable of communicating its decoding success/failure with BS 105 before BS 105 sends ACK/NAK message to UE 116, (3) able to re-encode previously decoded packets and spatially multiplex them with the UE signal under amplification and forwarding, and (4) able to receive ACK/NAK message from BS 105 to UE 116 plus another special indicator to RS 110 itself.

As a first step, UE 116 is scheduled to transmit an initial packet transmission by BS 105. RS 110, after amplify-andforward operation, also demodulates the signal and decodes the packet, at the same time as BS 105 does.

There may be four possible results from RS 110 and BS 105 decoding: 1) Both BS 105 and RS 110 decodes fail, 2) both BS 105 and RS 110 decodes succeed, 3) BS 105 decode succeeds and RS 110 decode fails, and 4) BS 105 decode fails and RS 110 decode succeeds.

Figure 8:
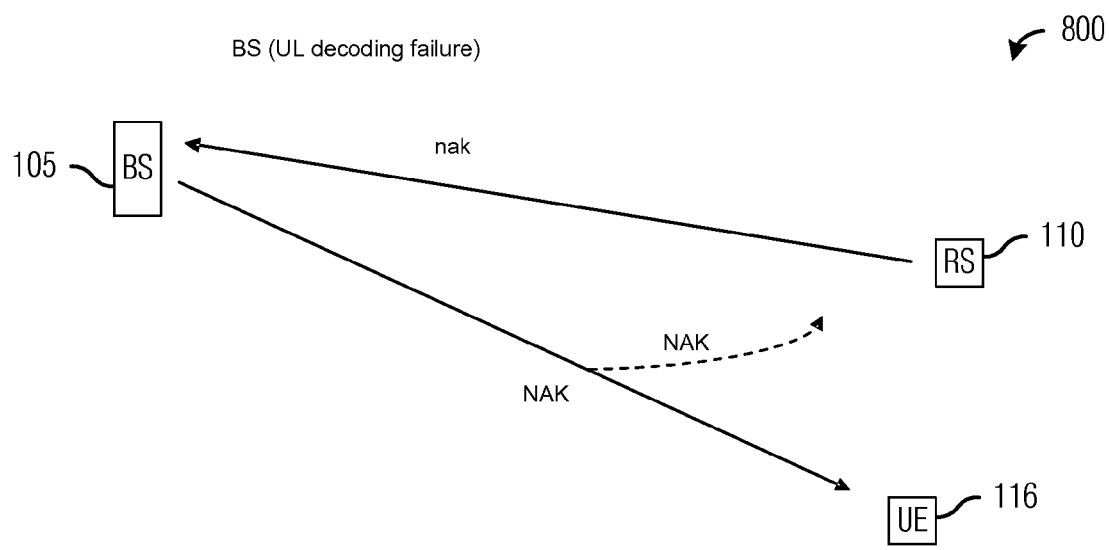
FIG. 8 is a diagram of a wireless communications system wherein both a BS and a RS decode attempt fails.

FIG. 8 illustrates a wireless communications system 800 wherein both BS 105 and RS 110 attempts at decoding a UE transmission fail. In this situation, RS 110 sends a nak (negative acknowledgement) message to BS 105 before BS 105 decides its physical hybrid automatic repeat request indicator channel (PHICH) response to UE 116, which in this situation is a NAK (also a negative acknowledgement) message (the use of lower case letters and italics distinguishes the nak message transmitted by RS 110 from the NAK message transmitted by BS 105). After receiving the nak message from RS 110, BS 105 sends a NAK message to UE 116 and continues conventional HARQ retransmission by UE 116. RS 110 may be capable of performing HARQ soft combining similar to BS 105 to increase its success probability in subsequent transmissions. The ability of RS 110 to perform soft combining provides diversity in HARQ decoding.

Figure 9:
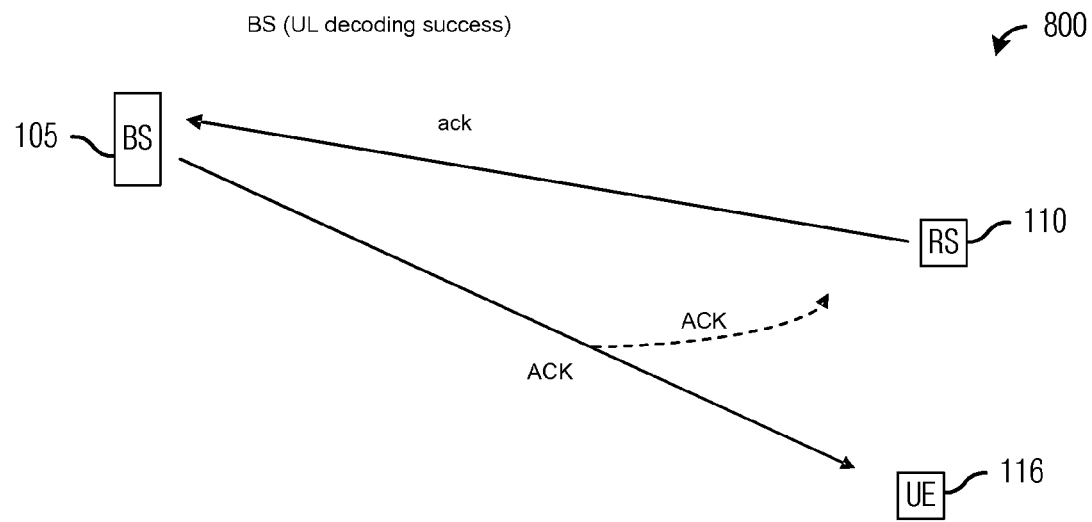
FIG. 9 is a diagram of a wireless communications system wherein both a BS and a RS decode attempt succeeds.

FIG. 9 illustrates a wireless communications system 800 wherein both BS 105 and RS 110 attempts at decoding a UE transmission succeed. In this situation, RS 110 sends an ack (positive acknowledgement) message to BS 105. However, the ack message from RS 110 does not matter since BS 105 will send an ACK (also a positive acknowledgement) message to UE 116 on PHICH (the use of lower case letters and italics distinguishes the ack message transmitted by RS 110 from the ACK message transmitted by BS 105). The HARQ instance ends as the uplink packet is already successfully received.

Figure 10:
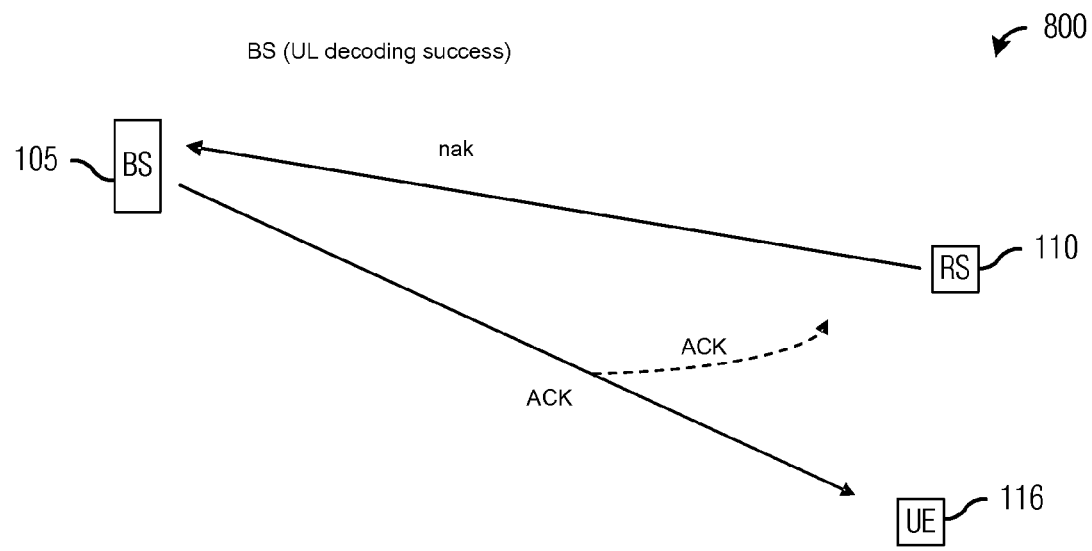
FIG. 10 is a diagram of a wireless communications system wherein a BS's decode attempt succeeds and a RS's decode attempt fails.

FIG. 10 illustrates a wireless communications system 800 wherein BS 105 decode attempt succeeds and RS 110 decode attempt fails. In this situation, RS 110 sends a nak message to BS 105. However, the nak message from RS 110 does not matter since BS 105 will send an ACK message to UE 116 on PHICH. The HARQ instance ends as the uplink packet is already successfully received. RS 110 may clear its soft value buffer since there are no more transmissions from UE 116 for this HARQ instance.

Figure 11:
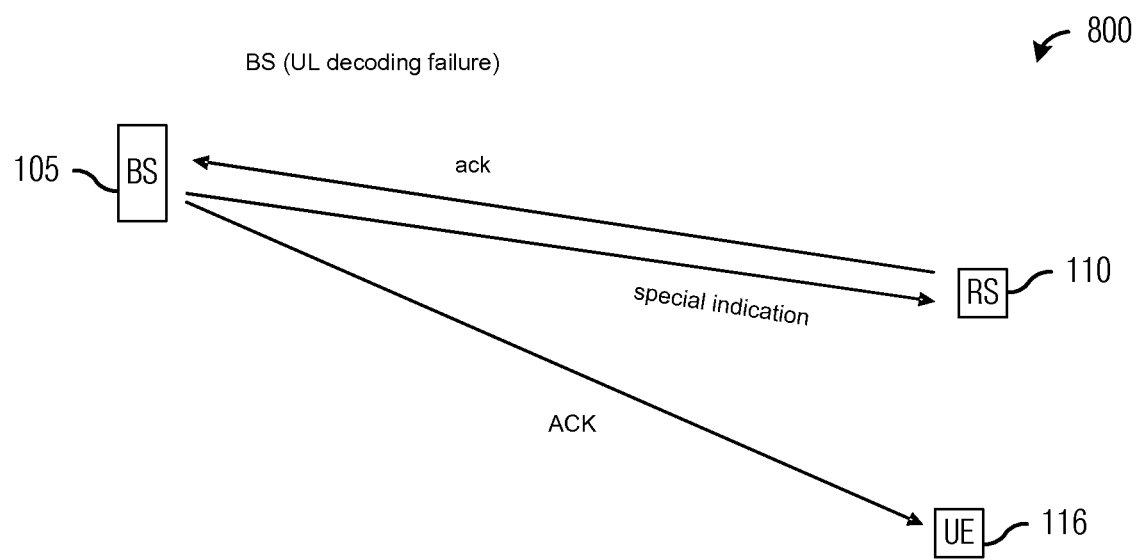
FIG. 11 is a diagram of a wireless communications system wherein a BS's decode attempt fails and a RS's decode attempt succeeds.

FIG. 11 illustrates a wireless communications system 800 wherein BS 105 decode attempt fails and RS 110 decode attempt succeeds. In this situation, RS 110 sends an ack message to BS 105 before BS 105 decides what to send on PHICH. Although BS 105 fails to decode the uplink packet successfully, upon receiving the ack from RS 110, BS 105 sends an ACK to UE 116 on PHICH to terminate the HARQ instance. Additionally, at the same time, BS 105 may transmit an indicator to RS 110. The indicator may inform RS 110 that RS 110 shall take over the remaining HARQ retransmission in place of UE 116. While RS 110 continues with the HARQ retransmission, RS 110 may continue to perform layer-1 relaying operations. Mathematical expression of the joint RS HARQ retransmission (a layer-2 relay) and the UE packet amplify-and-forward (advanced layer-1 relay) is expressible as shown below.

In addition to the mathematical notation defined in FIG. 2*a*, additional notation is defined as:

$d'_{D \times 1}$: data from RS-stored UE packet for retransmission
$P''_{K \times D'}$: precoder matrix for RS stored retransmission
$D'$: rank of RS stored retransmission, assuming K>D, D'<K−D.

The hybrid layer-1/layer-2 MIMO relay results in a received signal at BS 105 expressible as:

$$y_{M \times 1} = [U_{M \times K} \quad H_{M \times N}] \begin{bmatrix} P''_{K \times D'} & P'_{K \times D} \\ O_{N \times D'} & P_{N \times D} \end{bmatrix} \begin{bmatrix} d'_{D' \times 1} \\ d_{D \times 1} \end{bmatrix},$$

where BS 105 assigns a rank-(K+N) precoder matrix that multiplexes the layer-1 relay data $d_{D \times 1}$ and the layer-2 relay data $d'_{D \times 1}$.

The process of extending the uplink MIMO rank beyond the number of UE antennas by including RS antennas is summarized in Table 1, shown below.

TABLE 1

Summary of extending uplink MIMO rank.

| Result of current Tx | | RS intermediate action | Feedback from BS | | Actions of different nodes | | |
|---|---|---|---|---|---|---|---|
| UE→BS | UE→RS | RS→BS | BS→UE | BS→RS | BS | RS | UE |
| Pass | Pass | *ack* | ACK | — | HARQ instance ends. RS, UE, BS | | |
| Pass | Fail | — (*nak*) | ACK | — | clears HARQ buffer | | |
| Fail | Fail | — (*nak*) | NAK | — | Regular HARQ continues as if only BS and UE exist | | |
| Fail | Pass | *ack* | ACK | special indicator | Schedule new UE UL packet | Multiplex new UE packet L1 relay with previous packet reTx | Transmit new UL packet |

Note:
The lower case and italicized *ack*/*nak* and the special indicator are new overhead channels between BS and RS.
The lower case and italics are used to distinguish from the existing BS-UE PHICH.
The "—" represents a possibility, not a restriction, of using on-off signaling for less interference.

Figure 12:
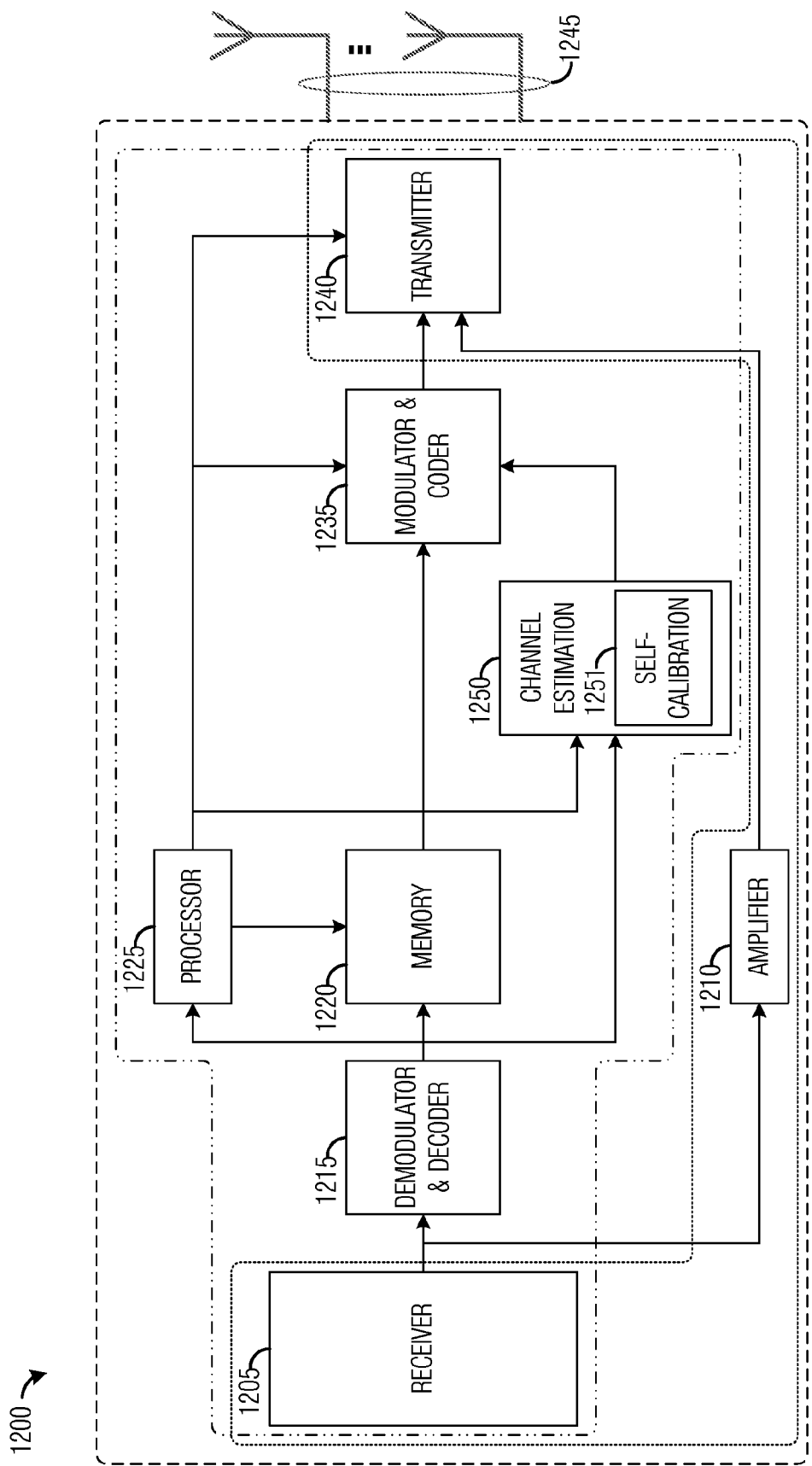
FIG. 12 is a diagram of a RN.

FIG. 12 illustrates a relay node (RN) 1200. As shown in FIG. 12, RN 1200 includes both repeater and smart repeater operation. RN 1200 includes a receiver 1205 for receiving transmitted signals. The transmitted signals may originate from a BS, such as BS 105, or a UE serviced by RN 1200, such as UE 116. RN 1200 also includes an amplifier 1210 for amplifying the received signal for use in amplifying-and-forwarding when RN 1200 is operating as a repeater. The amplified received signal may then be provided to a transmitter 1240 where the amplified received signal may be prepared for over-the-air transmission to an intended recipient, such as a UE or an eNB, by way of antennas 1245. Collectively, receiver 1205, amplifier 1210, and transmitter 1240 make up the repeater of RN 1200.

RN 1200 also includes a demodulator & decoder 1215 and a memory 1220 that may be used for the smart repeater portion of RN 1200. Demodulator & decoder 1215 may be used to demodulate & decode the received signal for storage in memory 1220. In addition to demodulating and decoding the received signal, demodulator & decoder 1215 may also perform analog to digital conversion. Memory 1220 may store the received signal or a portion thereof in an undemodulated/undecoded, demodulated/undecoded, or demodulated/decoded form. Memory 1220 may also store control signals from the received signal. According to an embodiment, memory 1220 may store only control signals that RN 1200 is not capable of generating by itself.

RN 1200 also includes a channel estimation unit 1250 that may be used to estimate a channel between RN 1200 and the BS or between the UE and RN 1200. Channel estimation unit 1250 may estimate the channel $U_{M \times K}$ by examining pilots transmitted by the BS or by measuring transmissions made by the BS over a period of time. Channel estimation unit 1250 may estimate the channel $V_{K \times N}$ by examining sounding signals transmitted by the UE or by measuring transmissions made by the UE over a period of time. Channel estimation unit 1250 may further include a self calibration unit 1251 to estimate the frequency response for the signal path between receiver 1205 and transmitter 1240. Thus channel estimation unit 1250 may produce an estimate of an overall channel including the over-the-air channel between the BS and RN 1200 ($U_{M \times K}$) or the over-the-air channel between the UE and RN 1200 ($V_{K \times N}$), and the signal path between receiver 1205 and transmitter 1240 through amplifier 1210 using self-calibration unit 1251, since the overall channel is what a signal may experience while the repeater is on.

The estimate of the overall channel may be provided to a modulator & coder 1235 such that modulator & coder 1235 may multiply a transmit symbol, in the frequency domain, with a coefficient that is based on the estimate of the overall channel. The application of the coefficient may make it appear to a receiver of the transmission (e.g., the UE for a downlink transmission or the BS for an uplink transmission) that the information originates from the BS (for a downlink transmission) or the UE (for an uplink transmission) rather than from RN 1200. According to an alternative embodiment, rather than computing its own estimate of the overall channel, RN 1200 may receive an estimate computed by an external source, such as the BS.

A processor 1225 coupled to demodulator & decoder 1215 may process control signals present in the received signal. Processor 1225 may also be used to control and/or adjust operation of RN 1200 based on the control signals present in the received signal. For example, processor 1225 may switch an operating mode of RN 1200 from repeater on to repeater off and vice versa based on the control signals. Furthermore, processor 1225 may be used to generate control signals. In an alternative embodiment, a separate unit of RN 1200 may be used to generate control signals.

Generally speaking, the transmissions between RN 1200 and the UEs are scheduled by the BS. Such scheduling information is provided to the UE (as well as RN 1200). The scheduling information may be received by RN 1200 in transmissions made by the BS and received by RN 1200. Processor 1225 may be used to process scheduling information and to execute such a scheduled transmission (for DL) or reception (for UL) via its control over a modulator & coder 1235, and a transmitter 1240.

Modulator & coder 1235 coupled to channel estimation unit 1250 and processor 1225 may be used to encode and modulate a transmission that was previously demodulated and decoded by RN 1200. Modulator & coder 1235 may convert the information contained in the transmission to transmit symbols based on the scheduling instruction that is received from processor 1225. If the transmission is CRS based, modulator & coder 1235 may further multiply the transmit symbols (in the frequency domain) with a coefficient that may be an estimation of the channel response of $U_{M \times K}$ made by channel estimation unit 1250. Output of modulator & coder 1235 may be passed to transmitter 1240, which may output the signals to antennas 1245 for transmission.

Transmitter 1240 may also map output from modulator & coder 1235 onto beamforming vector(s) where appropriate. Processor 1225 may also control when transmitter 1240 should transmit the output signal from modulator & coder 1235 and when transmitter 1240 should transmit the output signal from amplifier 1210. Collectively, receiver 1205, demodulator & decoder 1215, memory 1220, processor 1225, channel estimation unit 1250, modulator & coder 1235, and transmitter 1240 make up the smart repeater of RN 1200.

Figure 13A:
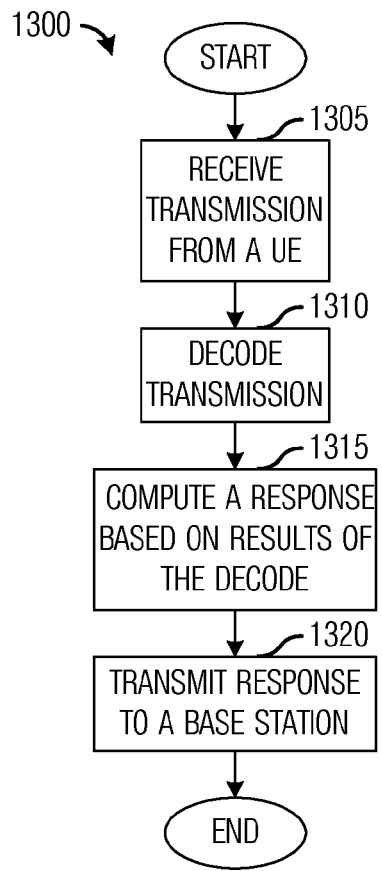
FIG. 13a is a flow diagram of smart relay operations for the increasing of uplink antenna dimension in conjunction with a HARQ transmission process.

FIG. 13a illustrates a flow diagram of smart relay operations 1300 for the increasing of uplink antenna dimension in conjunction with a HARQ transmission process. Smart relay operations 1300 may be indicative of smart relay operations in a HARQ transmission process wherein a smart relay, such as RS 110, is used in conjunction with a UE, such as UE 116, to increase MIMO rank beyond the number of transmit antennas at both the UE and the smart relay.

Smart relay operations 1300 may begin with the smart relay receiving a transmission from the UE (block 1305). Instead of simply amplifying and then forwarding the transmission from the UE, the smart relay attempts to decode the transmission (block 1310). The smart relay's attempt to decode the transmission may either succeed or fail. The smart relay may then compute a response, wherein the response is based on the result of the smart relay's attempt to decode the transmission (block 1315). The smart relay may then transmit the response to a base station, such as BS 105 (block 1320). Smart relay operations 1300 may then terminate.

For example, if the smart relay was able to successfully decode the transmission, the computed response may be an acknowledgment (ack) message, while if the smart relay was not able to successfully decode the transmission, the computed response may be a negative acknowledgment (nak) message. As discussed previously, the ack and nak messages transmitted by the smart relay may be different from ACK and NAK messages transmitted by the BS.

Similarly, in a downlink transmission, the smart relay may receive a transmission from the BS intended for the UE. The smart relay may decode the received transmission and transmit an appropriate response (either an ack or a nak message) to the BS. The smart relay may also receive a response from the UE, the response from the UE indicating a success or failure of the UE's attempt to decode the transmission from the BS.

If the smart relay was able to successfully decode the transmission from the BS but the UE was not, the smart relay may receive a transmission from the BS indicating that the smart relay may take over in the HARQ retransmission process. After receiving the transmission from the BS indicating that the smart relay may take over in the HARQ retransmission process, the smart relay may retransmit the transmission from the BS to the UE.

If the smart relay receives the response from the UE indicating that the UE was successful in decoding the transmission (either the original transmission from the BS or a retransmission from the smart relay or the BS), the smart relay may remove the transmission from its memory (buffer). If the smart relay does not receive the response from the UE indicating that the UE was successful in decoding the transmission, the smart relay may still remove the transmission from its memory (buffer) if the smart relay receives a transmission from the BS indicating the UE was successful in decoding the transmission.

Figure 13B:
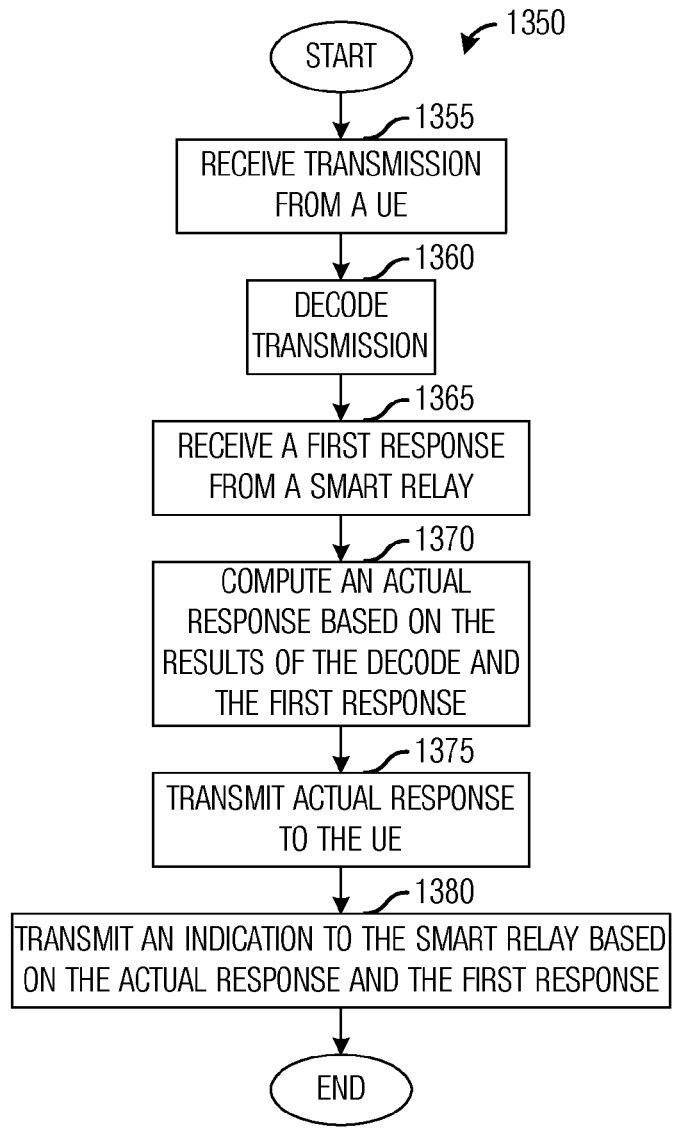
FIG. 13b is a flow diagram of base station operations in the increasing of uplink antenna dimension in conjunction with a HARQ transmission process.

FIG. 13b illustrates a flow diagram of base station operations 1350 in the increasing of uplink antenna dimension in conjunction with a HARQ transmission process. Base station operations 1350 may be indicative of base station operations in a HARQ transmission process wherein a smart relay, such as RS 110, is used in conjunction with a UE, such as UE 116, to increase MIMO rank beyond the number of transmit antennas at both the UE and the smart relay.

Base station operations 1350 may begin with the base station receiving a transmission from the UE (block 1355). The base station may attempt to decode the transmission (block 1360). The base station's attempt to decode the transmission may either succeed or fail. The base station may then receive a first response from the smart relay, wherein the first response comprises results of the smart relay's attempt to decode the transmission from the UE (block 1365).

Based on the result of its own attempt to decode the transmission and the first response received from the smart relay, the base station may compute an actual response to the received transmission (block 1370). The base station may transmit the actual response to the UE (block 1375). Furthermore, depending on the actual response and the first response, the base station may transmit an indication to the smart relay (block 1380). Base station operations 1350 may then terminate.

For example, if the base station was able to successfully decode the received transmission, then the base station may transmit an ACK message to the UE, regardless of the result of the smart relay's attempt to decode the transmission. However, if the base station was not able to successfully decode the received transmission and the smart relay was able to successfully decode the received transmission, then the base station may transmit an ACK message to the UE and an indicator message to the smart relay. If both the base station and the smart relay were not successful in decoding the received transmission, then the base station may transmit a NAK message to the UE.

The same principle may be applied to the downlink, with an only difference being that the transmitter and a scheduler both reside in the BS. The application of layer-1 relaying to the downlink may be the same as in the case of the uplink, with only the transmitter and receiver pair being reversed, changing from UE to BS to BS to UE.

With the downlink, the smart relay does not inform the receiver (the UE) about its result of decoding downlink packets but sends an ack/nak message to the transmitter (the BS) instead. If the UE sends an ACK message back the BS, the smart relay will clear its buffer regardless of its decoding result since no HARQ retransmission is needed. If the smart relay fails to decode the downlink packet and the UE sends a NAK message to the BS, the HARQ process will continue in the conventional way.

However, when the UE sends a NAK message to the BS but the smart relay indicates an ack message to the BS, the BS will instruct the smart message to send the HARQ retransmission to the UE and may spatially multiplex a new packet on the downlink if the UE's receive antenna dimension can support the total rank of the downlink MIMO system consisting of the smart relay and the BS transmit antennas.

The downlink MIMO rank indication and reference signal shall be adjusted accordingly. The BS will indicate the downlink MIMO rank as including both the BS itself and the HARQ retransmission out of the smart relay, for example. In the mean time, the reference signal structure should reflect the total number of MIMO rank in order to demodulate the spatially multiplexed BS and smart relay signals.

According to another embodiment, a goal is to make the RS signal, when added to the UE-to-BS signal, i.e., an uplink signal, maintain a desired composite channel. Assume the desired composite channel is $H_{M\times N} \cdot P_{N\times D}$. RS 110 may try to satisfy $$U_{M\times K} \cdot \Pi_{K\times K} \cdot V_{K\times N} \cdot P_{N\times D} = \alpha \cdot H_{M\times N} \cdot P_{N\times D},$$

where $\alpha$ is a scaling constant related to power control. BS 105 may explicitly send $U_{M\times K}$ and $H_{M\times N}$, or only $U_{M\times K}$ if RS 110 knows precoder selection criterion of BS 105 and thereby can infer $H_{M\times N}$. Then RS 110 can solve for the complementary precoder (or mid-coder) $\Pi_{K\times K}$ by $$U_{M\times K} \cdot \Pi_{K\times K} \cdot V_{K\times N} = \alpha \cdot H_{M\times N}$$

In another embodiment, BS 105 can adjust its precoder if RS 110 is designed to report $V_{K\times N}$ to BS 105. In that case, BS 105 calculates the new precoder matrix based on the new MIMO channel $(H_{M\times N} + U_{M\times K} \cdot V_{K\times N})$.

Yet another embodiment, RS 110 simply tries to make $U_{M\times K} \cdot \Pi_{K\times K} \cdot V_{K\times N} \cdot P_{N\times D}$ match a given MIMO channel response, $\Delta_{M\times D}$, for example. The signal $\Delta_{M\times D} d_{D\times 1}$ serves as a dominating "good" majority, e.g., a line-of-sight component in the total received signal at BS 105. Then the mid-coder, $\Pi_{K\times K}$, may be solved based on the following equation:

$$U_{M\times K} \cdot \Pi_{K\times K} \cdot V_{K\times N} \cdot P_{N\times D} = \Delta_{M\times D}$$

that only requires infrequent update from the BS regarding $U_{M\times K}$ and the assigned UE precoder $P_{N\times D}$ from monitoring the downlink signaling.

RS 110 does not need to demodulate the traffic signal being relayed but only to monitor the control signaling between BS 105 and the UEs as part of the advanced relay process. RS 110 applies the extra information to make the amplify-and-forward operation more intelligent such that the sum of RS and UE signals received at BS 105 are mutually constructive for desired performance.

The mid-coder of RS 110 may be computed based on a predetermined optimization criterion and offload computation complexity from BS 105 to RS 110 as well as minimize the required channel state information exchange between BS 105 and RS 110 for different UE's that are being served.

Figures 14A, 14B:
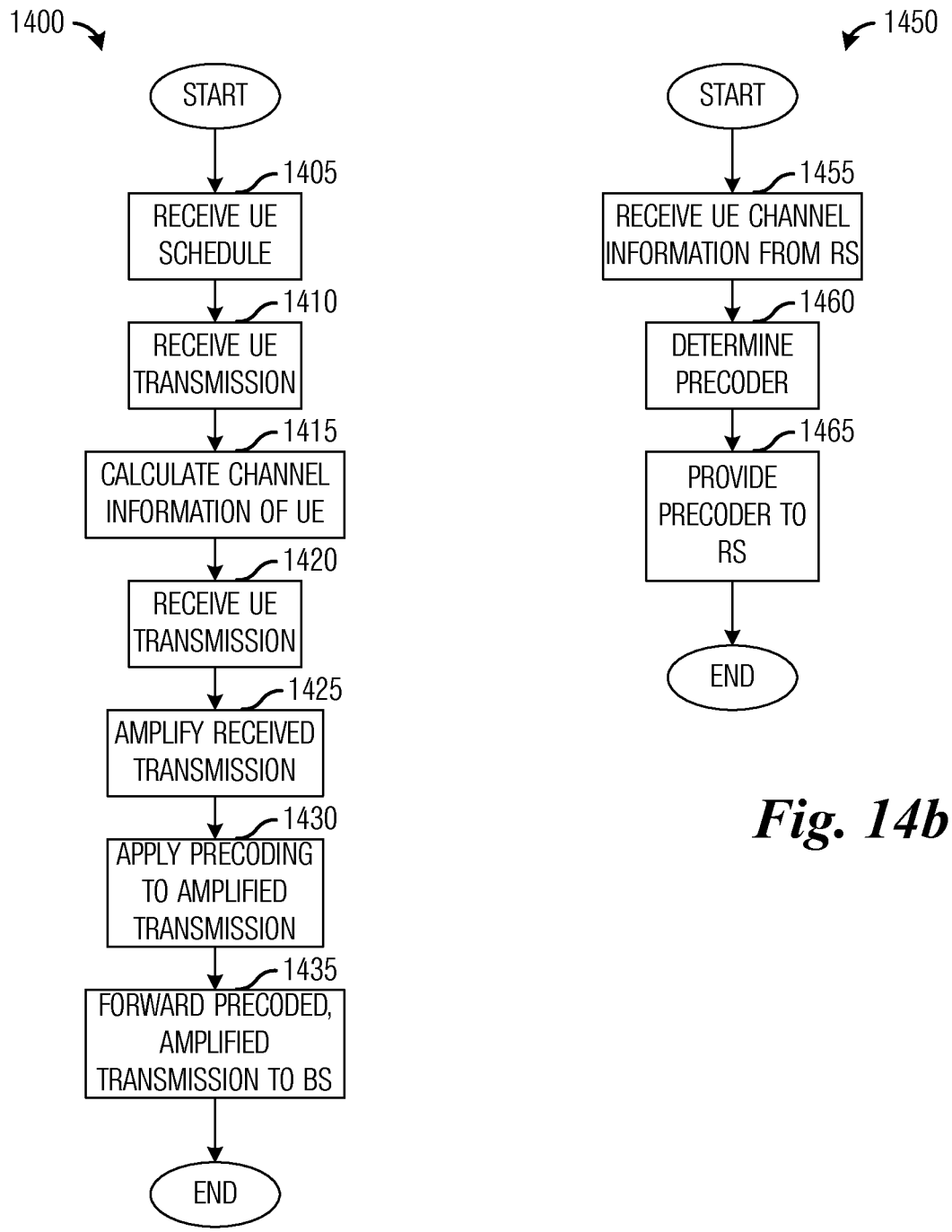
FIG. 14a is a flow diagram of smart relay operations for maintaining a desired composite channel.
FIG. 14b is a flow diagram of BS operations for maintaining a desired composite channel.

FIG. 14a illustrates a flow diagram of smart relay operations 1400 for maintaining a desired composite channel. Smart relay operations 1400 may be indicative of smart relay operations in a relay process wherein a smart relay, such as RS 110, to maintain a desired composite channel of transmissions originating at a UE, such as UE 116, to a BS, such as BS 105, relayed through the smart relay will apply a precoder to the transmissions.

Smart relay operations 1400 may begin with the smart relay monitoring the BS's control signaling to the UE. By monitoring the BS's control signaling, the smart relay may be able to determine the UE's transmission schedule (block 1405). Since the BS specifies the UE's transmissions, the smart relay may determine the UE's transmission schedule by receiving control signaling from the BS. In addition to learning the UE's transmission schedule, the smart relay may be able to determine a precoder used by the BS to beamform its transmissions to the UE. Since a channel between the smart relay and the BS remains relatively static, the smart relay can successfully decode the control signaling from the BS to the UE with high probability.

Using the UE's transmission schedule, the smart relay may be able to intercept the UE's transmissions (block 1410). From the intercepted UE transmission(s), the smart relay may be able to determine channel state information for a channel from the UE to the BS (block 1415). Since the UE probably is not transmitting a sounding signal or some other reference signal, the smart relay may be able to determine the channel state information for the channel by measuring transmissions made by the UE over a period of time.

According to an embodiment, since $U_{M \times K}$ is known by the BS and $V_{M \times K}$ is known by the smart relay, the smart relay attempts to satisfy the expression $$U_{M \times K} \cdot \Pi_{K \times K} \cdot V_{K \times N} \cdot P_{N \times D} = \Delta_{M \times N} \cdot P_{N \times D},$$

where $\Delta_{M \times N}$ is a MIMO channel response and may be provided to smart repeater by the communications system. The BS may provide $U_{M \times K}$ to the smart relay and the smart relay may solve for $\emptyset_{K \times K}$ so that $$U_{M \times K} \cdot \Pi_{K \times K} \cdot V_{K \times N} = \Delta_{M \times N}$$

is satisfied.

According to an alternative embodiment, since $U_{M \times K}$ is known by the BS and $V_{M \times K}$ is known by the smart relay, the smart relay attempts to satisfy the expression $$U_{M \times K} \cdot \Pi_{K \times K} \cdot V_{K \times N} = \alpha \cdot H_{M \times N},$$

where $\alpha$ is value related to transmit power. The BS may provide $U_{M \times K}$ and $H_{M \times N}$ to the smart relay and the smart relay may solve for $\Pi_{K \times K}$ so that $$U_{M \times K} \cdot \Pi_{K \times K} \cdot V_{K \times N} = \alpha \cdot H_{M \times N}$$

is satisfied.

According to yet another alternative embodiment, $U_{M \times K}$ is known by the BS and $V_{M \times K}$ is known by the smart relay. The smart relay may send $V_{M \times K}$ to the BS. The BS may then either determine a new precoder based on $$(H_{M \times N} + U_{M \times K} \cdot V_{K \times N}) \cdot P_{N \times D} = H_{M \times N} \cdot P_{N \times D},$$

or the BS may simply restart precoder calculations based on $$H_{M \times N} + U_{M \times K} \cdot V_{K \times N}.$$

According to yet another alternative embodiment, $U_{M \times K}$ is known by the BS and $V_{M \times K}$ is known by the smart relay. Furthermore, the smart relay may be viewed as an extra dimension of the UE and the BS may assign higher-dimensional precoding according to transmit antennas of the UE and the smart relay. The smart relay may solve for $\Pi_{K \times K}$ so that $$P'_{K \times D} = \Pi_{K \times K} \cdot V_{K \times N} \cdot P_{N \times D},$$

where $$[(P'_{K \times D})^T (P_{N \times D})^T]$$

is determined by $$[U_{M \times K} \quad H_{M \times N}] \cdot \begin{bmatrix} P'_{K \times D} \\ P_{N \times D} \end{bmatrix}.$$

Once the smart relay has the channel state information for the UE, the smart relay may continue to monitor control signaling transmitted by the BS to receive the UE's transmission schedule. With the UE's transmission schedule, the smart relay may be able to intercept the UE's transmissions (block 1420). The smart relay may then amplify the intercepted transmissions (block 1425) and apply a precoding based on the channel state information for the UE (block 1430). The smart relay may forward the amplified and precoded transmissions to the BS (block 1435). With the precoding applied to the transmission, the forwarded transmissions from the smart relay may appear to the BS as if they originated from the UE instead of the smart repeater. Smart relay operations 1400 may then terminate.

FIG. 14b illustrates a flow diagram of BS operations 1450 for maintaining a desired composite channel. BS operations 1450 may be indicative of BS operations in a relay process wherein the BS determines a new precoder or restarts precoder calculations based on information provided by a smart relay, such as RS 110, to maintain a desired composite channel of transmissions originating at a UE, such as UE 116, to the BS, relayed through the smart relay will apply a precoder to the transmissions.

BS operations 1450 may begin with the BS receiving UE channel information $V_{M \times K}$ from the smart relay (block 1455). The BS may then either determine a new precoder based on $$(H_{M \times N} + U_{M \times K} \cdot V_{K \times N}) \cdot P'_{N \times D} = H_{M \times N} \cdot P_{N \times D},$$

or the BS may simply restart precoder calculations based on $$H_{M \times N} + U_{M \times K} \cdot V_{K \times N}$$

(block 1460). The BS may then provide the precoder to the smart relay (block 1465) and BS operations 1450 may then terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for smart relay operations, the method comprising:
   receiving, at a smart relay, a first transmission from a communications device;
   decoding the first transmission;
   receiving, at the smart relay, an undecoded second transmission, the second transmission comprising different data than the first transmission, wherein the first transmission and the second transmission are destined for a common destination;
   receiving, at the smart relay, a request to retransmit the first transmission to the common destination;
   multiplexing, by the smart relay, the decoded first transmission with the undecoded second transmission to produce a multiplexed signal; and
   transmitting, by the smart relay, the multiplexed signal to the common destination.

2. The method of claim 1, wherein the multiplexing comprises spatial multiplexing.

3. A method for smart relay operations, the method comprising:
   determining, by a smart relay, information related to a channel between a transmitter and a receiver;
   determining, by the smart relay, a precoder based on the information;
   receiving, at the smart relay, a transmission signal sent from the transmitter to the receiver;
   applying, by the smart relay, the precoder to the transmission signal to obtain a precoded transmission signal; and
   transmitting, by the smart relay, the precoded transmission signal to the receiver.

4. The method of claim 3, wherein determining information for a channel comprises: detecting a transmission schedule for the transmitter; measuring a transmission sent from the transmitter to the receiver; and computing the information from the transmission.

5. A method for smart relay operations, the method comprising:
   determining information related to a channel between a communications device and a controller;
   determining a precoder based on the information;
   receiving, at a smart relay, a transmission made by the communications device destined for the controller;
   amplifying the received transmission;
   applying the precoder to the received transmission; and
   transmitting the precoded transmission to the controller,
   wherein determining a precoder comprises:
   receiving a response of a channel between the smart relay and the controller ($U_{M \times K}$) from the controller;
   receiving a multiple input, multiple output channel response ($\Delta_{M \times N}$) from the controller; and
   computing the precoder ($\Pi_{K \times K}$) so that $U_{M \times K} \cdot \Pi_{K \times K} \cdot V_{K \times N} = \Delta_{M \times N}$ is satisfied, where $V_{K \times N}$ is a response of a channel between the communications device and the smart relay, M is a number of antennas used by the controller, K is a number of antennas used by the smart relay, and N is the number of antennas used by the communications device.

6. A method for smart relay operations, the method comprising:
   determining information related to a channel between a communications device and a controller;
   determining a precoder based on the information;
   receiving, at a smart relay, a transmission made by the communications device destined for the controller;
   amplifying the received transmission;
   applying the precoder to the received transmission; and
   transmitting the precoded transmission to the controller,
   wherein determining a precoder comprises:
   receiving a response of a channel between the smart relay and the controller ($U_{M \times K}$) and a response of the channel between the communications device and the controller ($H_{M \times N}$) from the controller; and
   computing the precoder ($\Pi_{K \times K}$) so that $U_{M \times K} \cdot \Pi_{K \times K} \cdot V_{K \times N} = \alpha \cdot H_{M \times N}$ is satisfied, where $\alpha$ is a value related to transmit power, $V_{K \times N}$ is a response of a channel between the communications device and the smart relay, M is a number of antennas used by the controller, K is a number of antennas used by the smart relay, and N is the number of antennas used by the communications device.

7. A method for smart relay operations, the method comprising:
   determining information related to a channel between a communications device and a controller;
   determining a precoder based on the information;
   receiving, at a smart relay, a transmission made by the communications device destined for the controller;
   amplifying the received transmission;
   applying the precoder to the received transmission; and
   transmitting the precoded transmission to the controller,
   wherein determining a precoder comprises computing the precoder ($\Pi_{K \times K}$) so that $P'_{K \times D} = \Pi_{K \times K} \cdot V_{K \times N} \cdot P_{N \times D}$, where $[(P'_{K \times D})^T (P_{N \times D})^T]$ is determined by $$[U_{M \times K} \quad H_{M \times N}] \cdot \begin{bmatrix} P'_{K \times D} \\ P_{N \times D} \end{bmatrix},$$

where $U_{M \times K}$ is a response of a channel between the smart relay and the controller, $H_{M \times N}$ is a response of the channel between the communications device and the controller, $P_{N \times D}$ is a precoder matrix, $P'_{K \times D}$ is a new precoder matrix, M is a number of antennas used by the controller, K is a number of antennas used by the smart relay, N is the number of antennas used by the communications device, D is a rank of a transmission, and T is a higher-dimensional precoding parameter.

8. A method for smart relay operations, the method comprising:
   determining information related to a channel between a communications device and a controller;
   determining a precoder based on the information;
   receiving, at a smart relay, a transmission made by the communications device destined for the controller;
   amplifying the received transmission;
   applying the precoder to the received transmission; and
   transmitting the precoded transmission to the controller,
   wherein determining a precoder comprises:
   transmitting a response of a channel between the communications device and the smart relay ($V_{M \times K}$) to the controller; and
   receiving the precoder from the controller, wherein the precoder is based on $V_{M \times K}$, where M is a number of antennas used by the controller, and K is a number of antennas used by the smart relay.

9. The method of claim 8, wherein the precoder is computed as $$(H_{M \times N} + U_{M \times K} \cdot V_{K \times N}) \cdot P'_{N \times D} = H_{M \times N} \cdot P_{N \times D},$$

where $U_{M \times K}$ is a response of a channel between the smart relay and the controller, $H_{M \times N}$ is a response of the channel between the communications device and the controller, $P_{N \times D}$ is a precoder matrix, and $P'_{N \times D}$ is a new precoder matrix, M is a number of antennas used by the controller, K is a number of antennas used by the smart relay, N is the number of antennas used by the communications device, D is a rank of a transmission, and D' is a rank of a retransmission.

10. The method of claim 8, wherein the precoder is computed as $$H_{M \times N} + U_{M \times K} \cdot V_{K \times N},$$

where $H_{M \times K}$ is a response of a channel between the smart relay and the controller, $H_{M \times N}$ is a response of the channel between the communications device and the controller, M is a number of antennas used by the controller, K is a number of antennas used by the smart relay, and N is the number of antennas used by the communications device.

11. The method of claim 1 further comprising:
generating a hybrid automatic repeat request (HARQ) retransmission in accordance with the decoded first transmission,
wherein multiplexing the decoded first transmission with the second transmission comprises multiplexing, by the smart relay, the HARQ retransmission with the second transmission.

12. A relay comprising:
a processor; and
a computer readable storage medium storing programming for execution by the processor, the programming including instructions to:
determine information related to a channel between a transmitter and a receiver;
determine a precoder in accordance with the information related to the channel between the transmitter and the receiver;
receive, from a transmitter, a transmission signal destined for a receiver;
apply, by the relay, the precoder to the transmission signal to obtain a precoded transmission signal; and
transmit the precoded transmission signal to the receiver, wherein the instructions to determine the precoder include instructions to perform one or more of the following:
(a) intercept and at least partially decode control signaling communicated between the transmitter and the receiver; and determine the precoder in accordance with the at least partially decoded control signaling;
(b) determine the precoder in accordance with precoder values communicated by the transmitter; or
(c) determine channel state information related to a wireless channel extending between the transmitter and receiver; and determine the precoder in accordance with the channel state information related to the wireless channel, wherein the precoder comprises a complimentary precoder that is different than an original precoder used by the transmitter to beamform the transmission destined for the receiver.

13. The relay of claim 12, wherein the precoder is the same as an original precoder used by the transmitter to beamform the transmission destined for the receiver.

14. The relay of claim 13, wherein the instructions to determine the precoder include instructions to determine the precoder in accordance with precoder values communicated by the transmitter.

15. The relay of claim 12, wherein the instructions to determine the precoder include instructions to:
intercept and at least partially decode control signaling communicated between the transmitter and the receiver; and
determine the precoder in accordance with the at least partially decoded control signaling.

16. The relay of claim 12, wherein the instructions to determine the precoder include instructions to:
determine channel state information related to a wireless channel extending between the transmitter and receiver; and
determine the precoder in accordance with the channel state information related to the wireless channel, wherein the precoder comprises a complimentary precoder that is different than an original precoder used by the transmitter to beamform the transmission destined for the receiver.

17. A relay for performing hybrid layer-1/layer-2 relay operations, the relay comprising:
a processor; and
a computer readable storage medium storing programming for execution by the processor, the programming including instructions to:
receive a first transmission communicated between a transmitter and a receiver;
decode the first transmission;
receive a negative acknowledgment (NACK) message indicating that the receiver was unable to decode the first transmission;
generate a hybrid automatic repeat request (HARQ) retransmission in accordance with the decoded first transmission;
receive an undecoded second transmission destined for the receiver, the undecoded second transmission received after the first transmission;
multiplex the HARQ retransmission with the undecoded second transmission to produce a multiplexed transmission; and
transmit the multiplexed transmission to the receiver.

18. The relay of claim 17, wherein the HARQ retransmission and the second transmission are multiplexed in accordance with a spatial multiplexing technique.

* * * * *